Aug. 10, 1965    H. S. FITZGERALD    3,200,209
ADJUSTABLE CONTROLLER FOR PREDETERMINED CONTROL-PROGRAMS
Filed Jan. 5, 1962    5 Sheets-Sheet 1

Aug. 10, 1965   H. S. FITZGERALD   3,200,209
ADJUSTABLE CONTROLLER FOR PREDETERMINED CONTROL-PROGRAMS
Filed Jan. 5, 1962   5 Sheets-Sheet 2

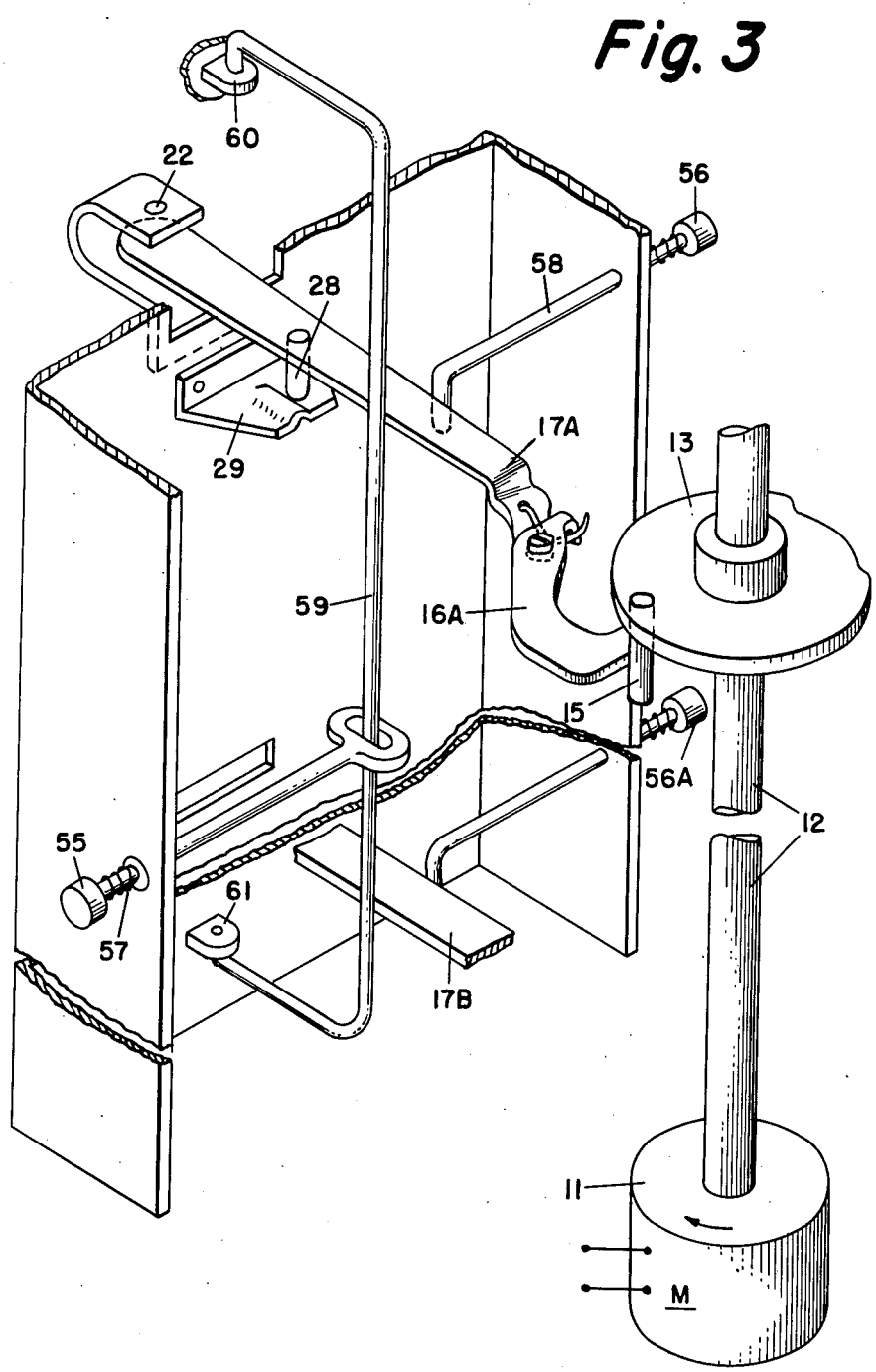

Aug. 10, 1965  H. S. FITZGERALD  3,200,209
ADJUSTABLE CONTROLLER FOR PREDETERMINED CONTROL-PROGRAMS
Filed Jan. 5, 1962

United States Patent Office 3,200,209
Patented Aug. 10, 1965

3,200,209
ADJUSTABLE CONTROLLER FOR PREDETERMINED CONTROL-PROGRAMS
Herbert S. Fitzgerald, Philadelphia, Pa., assignor to Leeds and Northrup Company, Philadelphia, Pa., a corporation of Pennsylvania
Filed Jan. 5, 1962, Ser. No. 164,582
14 Claims. (Cl. 200—18)

This invention relates to programmers for establishing repetitive control cycles for a plurality of control devices and has for an object the provision of a reliable arrangement by means of which a plurality of driven elements may each be set in like displacement from an associated control element, and during operation thereafter individually set in different control positions to establish any desired cycle of control operations which may be repeated indefinitely.

There have been many proposals of programmers of the type including cam operated switches and which by reason of the adjustability of the cams will operate in any desired sequence. These devices have left much to be desired in the ease of bringing all of the several elements back to initial positions and thereafter setting each control element for desired operation relative to the times of operation of the remaining control elements.

In carrying out the present invention in one form thereof, the programmer comprises a plurality of control devices each including a pair of control elements, one of which is adapted to be driven relative to the other by suitable driving means. For each pair of control elements there is provided set means operable into and out of the path of rotary motion of the driven element for bringing said elements into set positions when in said path of movement, each in like displacement from its associated control element and without interruption in rotation of the driving means. When the set means is operated out of said path of movement, said driven elements are released selectively for resumption of the drive of the driven elements in predetermined angular positions, and in this manner there may be established any desired repetitive control cycle by the control devices which will continue to be reproduced over and over and until the seat means again is brought into operation.

In a preferred form of the invention, the control elements may comprise cams and associated switches, the cams being frictionally driven by a timing motor and thus adapted by suitable stops to be brought to rest with the several cams in like positions relative to their respective operating positions for the switches.

For examples of the systems to which the present invention is particularly applicable and for an understanding of preferred embodiments, reference is to be had to the following detailed description taken in conjunction with the accompanying drawings, in which:

FIG. 3 is an isometric drawing diagrammatically illustrating manual control of the set and release means of the switching assembly;

Figure 4:
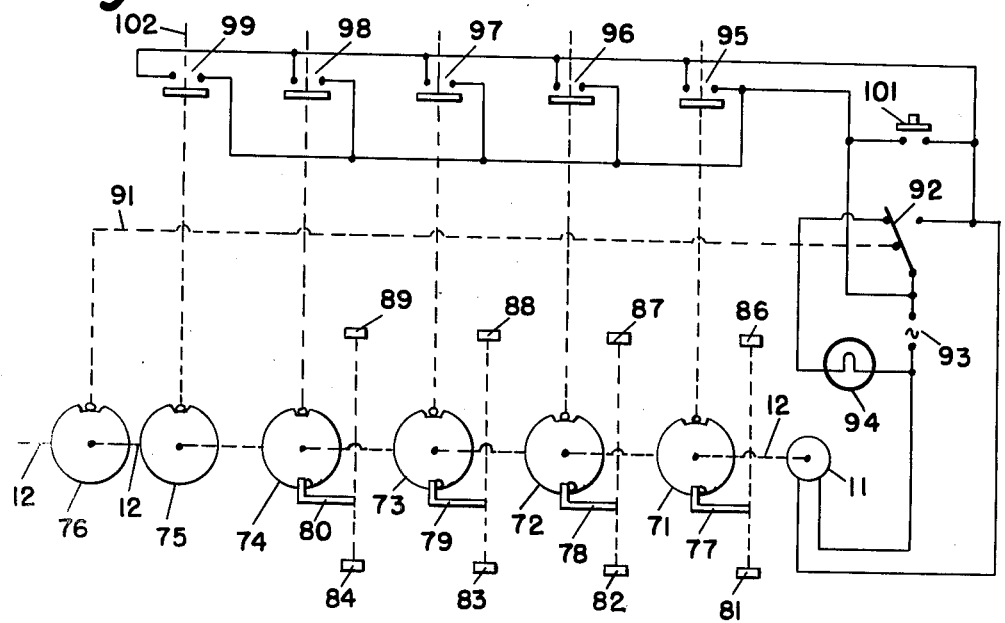
Figure 8:
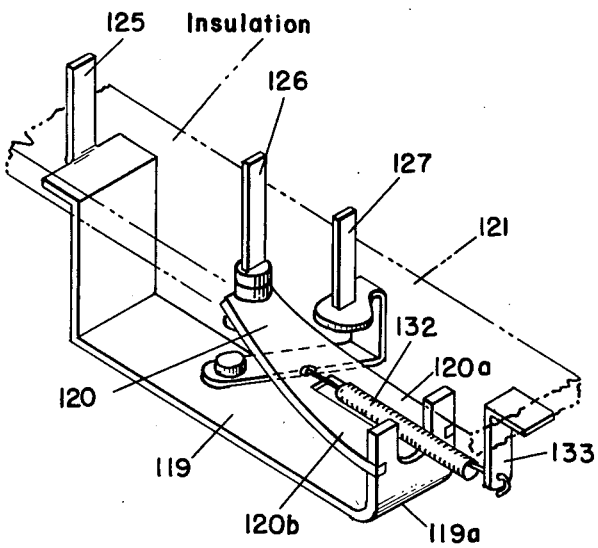
Figure 5:
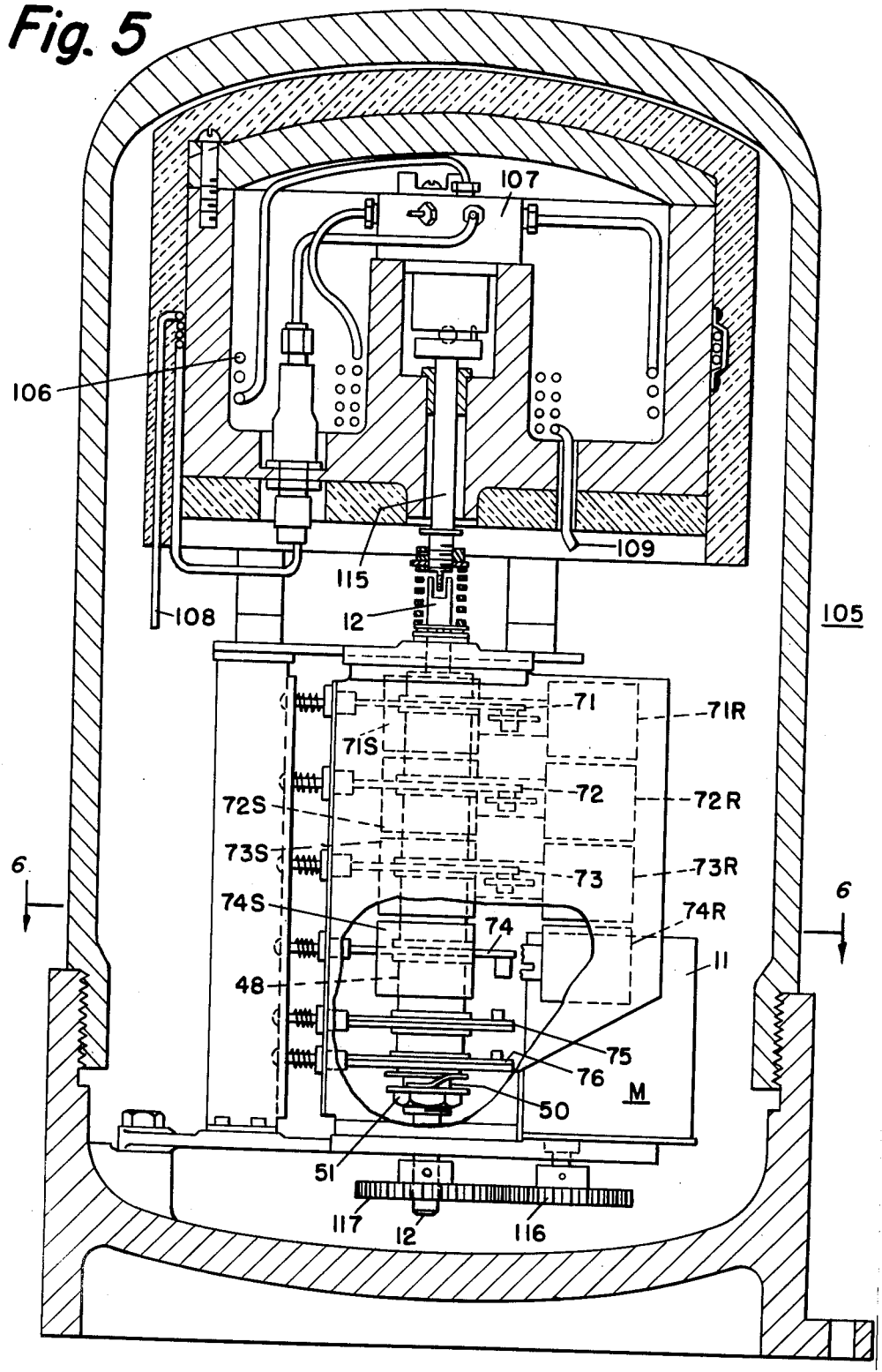
Figure 6:
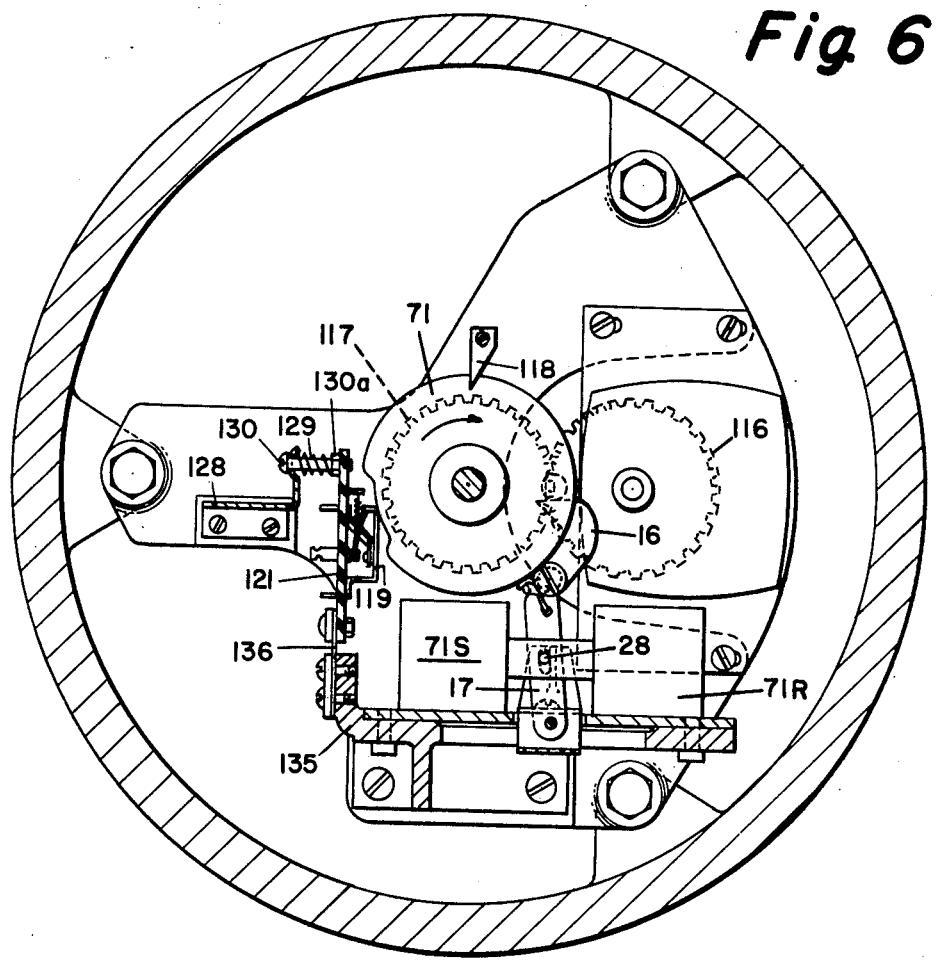
Figure 7:
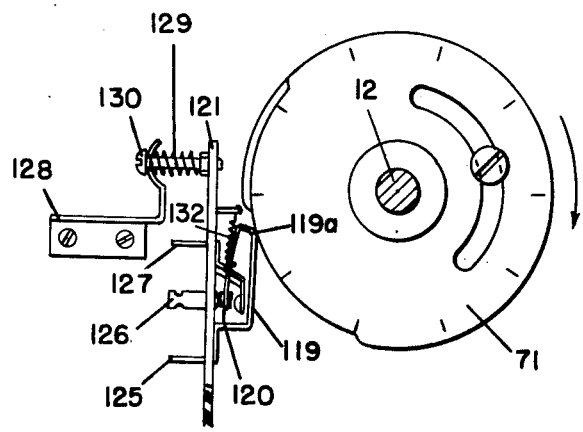

FIG. 4 diagrammatically illustrates the manner in which the angular positions of a plurality of remotely adjustable cams may be adjusted relative to other cams;

FIG. 5 is a sectional view of a fluid analyzer including a programmer embodying the present invention;

FIG. 6 is a view taken along the line 6—6 of FIG. 5;

FIG. 7 is an enlarged view of a cam and associated switch structure of FIG. 6; and FIG. 8 is an isometric view of the switch of FIGS. 6 and 7.

Figure 1:
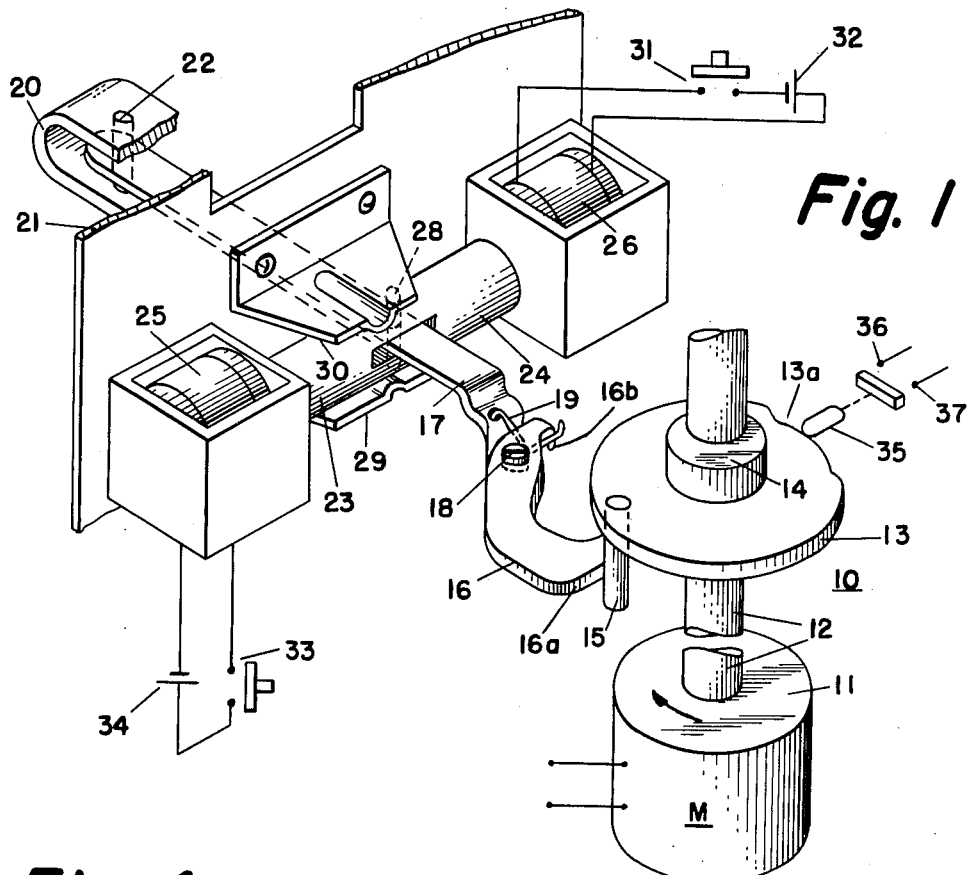
FIG. 1 is an isometric view of a typical one of a plurality of control elements embodying the invention.

Referring now to FIG. 1, the invention has been shown in one form as applied to a program controller 10 comprising a timing motor 11 arranged to drive a shaft 12 on which there will be mounted a plurality of control cams, only one of the cams, cam 13 appearing in FIG. 1. This cam 13 by means of a frictional driving assembly 14 is driven by drive shaft 12, as in a clock-wise direction, as indicated by the arrow, until stop structure in the form of a pin 15 engages an arresting means shown in the form of a pivoted pawl 16 held in the path of pin 15 as by a control lever 17.

Upon engagement of the pin 15 with the forward flat face 16a of pawl 16, the cam 13 is brought to standstill with continued rotation of the motor 11 and its shaft 12. In this manner, the cam 13 is restrained against rotation by the driving forces developed by the frictional drive 14. The pawl 16 is pivoted to the control arm 17 by pivot pin 18. This pin carries a coil spring 19 arranged to bias the pawl 16 in a counterclockwise direction with a depending ear 16b engaging the control arm 17 and acting as a stop-element. The arm 17 has its far end pivoted as by a pivot pin 22 to a bracket 20, itself secured to a frame 21. The arm 17 has extending through it a driving pin 28 which also serves to interconnect the plungers 23 and 24 of a pair of solenoids 25 and 26. The end of plunger 23 may have a U-shape to receive a U-shaped end of plunger 24 as well as the control arm 17. As shown, the plungers 23 and 24 comprise a single member with a slot through which extends control arm 17 which is connected to the member by pin 28.

The driving pin 28 extends outwardly on opposite sides of the member constituting plungers 23 and 24 to engage a pair of spring elements 29 and 30 provided with centrally disposed corrugated portions which, in conjunction with the outwardly extending ends of pin 28, form a detent device which biases the arm 17 in each of its two control positions. As illustrated in FIG. 1, the opposite ends of pin 28 bias or act to maintain control arm 17 in its right-hand control position as viewed in FIG. 1, which is to say, that if arm 17 is to be moved to the left, the opposite ends of pin 28 must deflect spring members 29 and 30 outwardly and until the ends of the pin 28 pass beyond the curved portions of the inwardly directed corrugations at which time the spring elements 29 and 30 will maintain and bias the arm 17 in its left-hand position.

As shown, the pawl 16 has been operated to its illustrated position by arm 17 as the result of prior closure of a set switch 31 which when momentarily operated completes a circuit from a suitable source of supply shown as a battery 32. For operation of the arm 17 to its left-hand position, a release switch 33 is momentarily operated to close the circuit from a suitable source of supply 34 to energize the solenoid 25 which thereupon rotates the arm 17 in a clockwise direction around its pivot pin 22 and moves the pawl 16 out of engagement with pin 15 and out of its path of movement by the cam 13. Where a plurality of solenoids are provided for a plurality of control cams, it will, of course, be understood that a single reset switch 31 may be operated simultaneously to energize the set solenoids to bring the arms to the position shown in FIG. 1 and thus to bring all frictionally driven cams to the same angular position.

As shown, a cam follower 35 is located midway of a trough 13a of cam 13. Upon movement of the pawl 16 out of the path of pin 15, the cam 13 begins to rotate with shaft 12. The cam follower 35 is then actuated by cam 13 to complete a control circuit by closure of contacts 36 and 37. Inasmuch as there may be provided a separate release switch 33 for each of a plurality of cams, it will be seen that the several cams can be set for operation at different angular positions as compared with that occupied by the cam first released by a release button corresponding with the button 33. The operation in conjunction with a plurality of cams will be later set forth, particularly in connection with FIGS. 4 and 5.

To move the arresting pawl to its illustrated position, the switch 31 will again be momentarily closed. Should the end of pawl 16a strike pin 15, the arm 17 will nevertheless continue its movement to its illustrated position. The spring 19 providing for the foregoing relative movement will bias pawl 16 into the path of movement of pin 15 and will be engaged by it upon movement against its flat arresting surface 16a.

Figure 2:
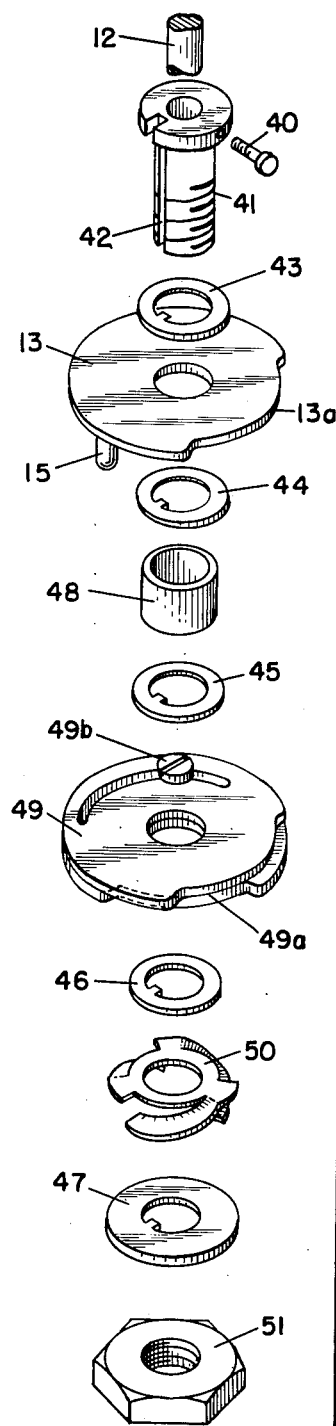
FIG. 2 is an exploded view of the friction drive for the several cams of which one is shown in FIG. 1.

Though the friction drive 14 may take many forms, a preferred arrangement has been illustrated in FIG. 2 where it will be observed that the shaft 12 has secured to it as by a set screw 40 a drive bushing 41 having a longitudinal groove 42 arranged to receive the driving elements of a plurality of key washers 43–47. Between the key washers 43 and 44 and loosely mounted on the bushing 41 is the cam 13. By utilizing a spacer 48 followed by the key washer 45, a second cam 49 may be carried by the hub 41. A spring 50 having a plurality of resilient arms is disposed between the key washers 46 and 47. By tightening a nut 51 on the threaded end of bushing 41, the resilient arms of the spring 50 may be compressed, thus to predetermine the friction developed between the key washers disposed on opposite sides of the cams 13 and 49 frictionally to drive them as the shaft 12 and bushing 41 are rotated.

It is to be understood that the cam 13 having the trough 13a of fixed arcuate extent may be replaced by a cam like the cam 49 where the trough or depression 49a is adjustable between relatively wide limits. Thus, by loosening a clamping screw 49b, the two elements comprising cam 49 may be angularly rotated with respect to each other, thus to widen or narrow the gap or trough 49a. Where a cam like the cam 49 is used in conjunction with the pawls or stop structures of FIG. 1, it will be understood there will be added a stop pin corresponding with the pin 15 carried by cam 13. In this connection, it is to be observed that the two elements of cam 49 may be separated by a key washer and the screw 49b removed so that the two elements of the cam will be separately driven by the bushing 41. By thus frictionally driving both of the elements and providing each with stop pins and associated setting pawls, their relative positions may be adjusted by controlling the stop pawls to produce the desired displacement between them.

Now that a preferred form of the invention has been explained, it will be understood that many modifications may be made. For example, it is not essential that the control arm 17 be operated by solenoids. It may be operated as shown in FIG. 3, by a pair of manually operable push buttons 55 and 56. Thus, the set push button 55 biased to its released position by a spring 57 can concurrently rotate a setting arm 59 pivoted at its ends as at 60 and 61 in supporting brackets to move a plurality of arms 17A and 17B to bring their respective pawls 16A, etc., into the path of movement of the stop structures in the form of the pin 15 of cam 13. Thus, all cams will be brought to standstill in the same angular positions. Individual push buttons are provided for release of each cam. The release button 56 upon actuation, as through a push rod 58, moves the control arm 17A and the associated pawl 16A out of the path of pin 15 to initiate rotation of cam 13 with motor shaft 12. Thus the push button 56A and the additional buttons (not shown) provide for the establishment of a plurality of control operations which will occur in successive cycles at the same relative times, referred to the time the first push button is set to initiate rotation of the first cam to be frictionally driven by shaft 12.

It will be understood that the means for arresting or restraining the cams 13 may be any one of the types well known by those skilled in the art. For example, a cavity or depression (not shown) may be formed on one face of the cam 13 in place of the pin 15 and the control arm 17 may carry, in place of the pawl 16, a member (not shown) adapted to be engaged in the cavity and in this manner to bring the cam 13 to a standstill.

With the above understanding of the invention, reference will now be had to FIG. 4 where the timing motor 11 has been illustrated as driving a shaft 12 on which there are mounted a plurality of cams 71–76 and all carried by the shaft in the same manner as described for the frictional drive assembly of FIG. 2. Though each of the stop structures are preferably of the type illustrated in FIGS. 1 and 3, they have been illustrated in FIG. 4 as comprising arms 77–80 manually movable as by set buttons 81–84 and also operable by release buttons 86–89 out of the path of stop pins carried by the respective cams 71–74. In this connection, it will, of course, be understood that solenoids, as shown in FIG. 1, may be utilized in lieu of the manually operable push buttons of FIG. 4. It is to be observed that cams 75 and 76 have not been illustrated as including set means and release means. In some instances, such cams can be utilized to determine the set positions of the remaining cams.

As shown in FIG. 4, the cam 76 as it arrived in its illustrated position operated through its cam follower and a mechanical connection 91 a single-pole, double-throw switch 92 to interrupt the circuit from a source of supply 93 to the timing motor 11 and to move that switch to its illustrated position where it energizes a signal lamp 94 indicative of the fact that all cams occupy their predetermined or set positions.

When any one of cams 71–75 occupies other than its set position, it will be noted that through the respective cam followers one or more of switches 95–99 will be closed to maintain energized the timing motor 11 independently of the position of the single-pole, double-throw switch 92. However, as each of cams 71–74 is brought to standstill by the stop structures 77–80 in the illustrated positions, their associated switches 95–98 will have been moved to their open positions. Accordingy, as cam 75 is moved to the same corresponding position, the last of contacts 95–99 opens, namely contact 99, to open the last of the holding circuits of the timing motor 11. The cam 76 at the same time operates the single-pole, double-throw switch 92 to deenergize the motor 11 and to energize the signal lamp 94. The programmer is now in readiness to have set up thereon a new control cycle in manner now to be set forth.

First a start button 101 is held closed until the signal light 94 is extinguished. The extinguishment of this signal lamp indicates that the cam follower for cam 76 has operated switch 92 to its right-hand position for energization of motor 11. At about the same time, the cam 75 closes contacts 99 to complete a holding circuit around the starting switch 101 and also around the single-pole, double-throw switch 92. As shown, the cam 75 through its mechanical connection 102 may be used to operate other control circuits, for example, as interlocking controls used in conjunction with the program controller as a whole. Thus as contacts 99 close, it will be known that time zero has been established and that thereafter as release cams 86–89 are in turn operated, the several associated cams 71–74 will be released and thereby there will be established the frictional driving connection between each of them and the drive shaft 12 of motor 11.

If at any time it is desired to set up a different program of control operations, it is only necessary to operate the set buttons 81–84 to move stop structures 77–80 to their illustrated positions to bring all parts to their zero or initial positions. By again pressing the start button 101, the new program may be established as desired. Thereafter, the motor 11 will operate continuously to repeat the control program and to carry out the control operations as the cam followers of the several cams 71–75 move into and out of the cam recesses. In this connection, the holding circuit traced through contacts 95–99 will always remain closed since there will be coincidence in their movement to their open positions only when all cams occupy identical angular positions as illustrated, and this, of course, cannot occur except in the set position.

It is to be understood, of course, that the important control functions performed by the cams 71–74 are in terms of their relative positions with respect to their cam followers. Thus, each cam may in the set position be displaced from the other to any desired angle if the cam followers be similiarly displaced. Inasmuch as the cam followers are preferably biased into, and are driven out of, the cam recesses or troughs, it is clear that these mechanical movements may be utilized directly to operate pneumatic controls and other types of mechanically initiated control operations in lieu of the simple closing and/or opening of control circuits. Moreover, crests may be utilized on the cams in place of recesses or in combination with them.

Referring now to FIG. 5, there has been illustrated in section a fluid analyzing device 105 including a chromatographic column 106 into which there is periodically introduced as by a control valve 107 a predetermined volume of a sample gas from a sample supply line 108, carrier gas being introduced by way of a supply line 109. In order that the control operations will be in timed relation with the introduction by the valve 107 of a predetermined volume of sample gas into the chromatographic column 106, the valve 107 is arranged to be driven by means of a shaft 115 having a driving connection with the drive shaft 12 of the timing motor 11. As shown, this motor drives shaft 12 through gears 116 and 117. On the shaft 12, it will be seen there have been provided the plurality of cams 71–76 respectively corresponding with those shown in FIG. 4. However, the cams 71–74 have associated therewith set solenoids 71S–74S and release solenoids 71R–74R. In FIG. 5, it will be further observed that the frictional drive assembly of FIG. 2 has been utilized, the compression spring 50 and nut 51 as well as the several spacers including the spacer 48 being particularly well illustrated.

Though structurally quite similar to the arrangement of FIG. 1, nevertheless the cam follower and switch structure associated with each of the cams is better illustrated in FIGS. 6–8.

Referring now to FIG. 6, it will be noticed that the set positions for the several cams can be taken as any given angular position, as for example, where on cam 71 there appears a mark (not shown) corresponding with the position of a fixed pointer or index 118. In this position, the curved end portion 119a of a follower 119, as shown in FIG. 7, is disposed midway of the trough or control recess of the cam 71. As further shown in FIG. 7, the cam 71 is of the adjustable type, i.e., like the cam 49 of FIG. 2. In the illustrated position, the movable member 120 of a single-pole, double-throw switch, best shown in FIG. 8, completes a circuit as from terminal 125 to terminal 126. When the member 120 is in its opposite position, a circuit is completed between terminals 125 and 127.

The switch assembly is supported from a bracket or arm 135 by means of a resilient element such as a leaf spring 136 clamped at one end to the arm 135 and at its opposite end to the lower end of the insulating member 121. The other end of the insulating member 121 has secured thereto a friction nut 130a which receives in threaded relation the end of an adjusting screw 130 extending through an opening in the upturned portion of a supporting bracket 128. A compression spring 129 at one end engages the upturned end of bracket 128 and at the opposite end presses againts the nut 130a. By rotating the screw 130 in one direction or the other, the member 121 will be moved toward or away from the bracket 128 and, thus, will move the follower or actuating arm 119 of the switch assembly toward and away from the cam 71. Thus, there may be precisely controlled the time of operation of the switch as the curved end 119a, FIG. 7, is moved by the cam outwardly of its recessed portion.

Referring to FIG. 8, the actuating arm 119 is molded at one end into the insulating member 121. The arm is made of spring material for developing a biasing force upon deflection from its illustrated position. The arm 119 has its curved portion 119a formed by a smoothly changing arcuate portion terminating in an upturned bracket having two slots or recesses which receive the ears formed at the ends of legs 120a and 120b of the movable switch member 120. There is thus provided within the recesses an axis of rotation for the switch member 120. As best shown in FIGS. 7–8, an over-center spring 132 has one end connected to a stationary bracket 133 carried by the insulating member 121 and its other end secured in an opening midway of the two legs 120a and 120b. The spring 132 is normally under tension, and in the positions illustrated in FIGS, 7 and 8 its line of action extends above the axis of rotation, FIG. 8 (and to the left of the axis of rotation, FIG. 7), thus to bias the switch member 120 with its movable contact against the stationary contact element 126.

It will be understood that rotation of the cam moving the switch arm 119 radially away from the axis of shaft 12 causes the axis of rotation of switch member 120 to cross the line of action of the spring 132, and beyond, making effective the force of the spring to produce a snap action of the switch member 120 to move it against the contact carried by switch terminal 127. Thus, the single-pole, double-throw switch of FIGS. 6–8 can be utilized with other like switches, FIG. 5, to set up control operations for the programmer as a whole. If desired, multiple-pole, double-throw switches may be utilized by simply increasing the number of movable and stationary contacts by means of which the multiple circuits may be opened and closed by operation of the switch arm 120.

Upon return of the recess of cam 71 to its illustrated positions in FIGS. 6 and 7, the spring-force of member 119 will move the curved end portion 119a in cam-following relation, again changing the line of action of the spring 132 to return the switch member 120 to its illustrated position.

It is to be understood that features of one embodiment of my invention may be utilized with and without features of other embodiments and that additional variations in design may be made within the scope of the appended claims.

What is claimed is:

1. A programmer comprising
   a plurality of control devices each including a pair of control elements one of which is adapted to be rotatably driven relative to the other,
   means for rotatably supporting and driven elements,
   driving means for concurrently rotating said driven elements,
   arresting means for said driven elements for bringing them to standstill in set positions each in like angular displacement with respect to its associated control element during continued operation of said driving means, and
   means operative during said continued operation of said driving means for controlling said arresting means selectively to release said driven elements for resumption of rotation by said driving means with said driven elements in different angular positions relative to their common set positions, whereby there may be established a selected repetitive control cycle by said control devices.

2. The programmer of claim 1 in which said arresting means comprises an arm pivoted about an axis located in spaced relation with the axis of rotation of said driven element and having stop structure at the end portion remote from its axis of rotation for movement into and out of the path of movement of stop structure carried by said driven element.

3. The programmer of claim 2 in which there are provided for each of said arms associated with said driven elements solenoid means for moving said arms and their stop structures into and out of the paths of movement of said driven elements.

4. The programmer of claim 3 in which said solenoid means comprises a set solenoid and a release solenoid for respectively driving said arm first in one direction and then in the opposite direction and respectively into and out of said path of movement of its associated driven element.

5. The programmer of claim 2 in which means are provided for concurrently moving a plurality of said arms with their stop structures into the respective paths of movement of the associated stop structures carried by their respective driven elements, and
means operable independently of each other for selectively moving said arms and their stop structures out of said paths of movement.

6. The programmer of claim 2 in which said stop structure of each said arm includes a pivoted element biased to an arresting position and providing relative movement between it and said arm in the event said pivoted member encounters resistance during the movement of said arm into said path of movement.

7. The programmer of claim 3 in which said solenoid means comprises
a set solenoid and a release solenoid coupled to each said arm,
means for energizing said set solenoids for moving said arresting arms to their arresting positions, and
means for energizing said release solenoids one at a time for moving said arresting arms to their releasing positions.

8. The combination with a plurality of control devices each including a first rotatable control element and a second relatively stationary control element, of means for establishing a program of repetitive control cycles by said control devices comprising
means for rotatably supporting said first elements,
means including a friction drive for driving said first control elements relative to their associated second control elements,
means for restraining each of said first control elements against rotation by the driving torque developed by said friction drive for bringing all of said first control elements to standstill in set positions with each first control element in like position relative to the position of its associated second control element, and
means operable independently of said driving means for controlling said restraining means for selectively releasing said first control elements for resumption of rotation with said first control elements in different predetermined control positions relative to each other to establish said program of repetitive control cycles.

9. A programming system comprising
a plurality of control devices each including a cam and a cam follower,
means rotatably supporting said cams,
driving means frictionally engaging said cams for rotating said cams relative to their associated cam followers,
stop structure carried by each cam, an arresting member for each of said cams, pivotal mounting means for said arresting means, and
means for operating said arresting members independently of said driving means to positions for
(1) engaging respectively said stop structures to bring said cams to standstill in set positions wherein they are restrained from rotation by the driving forces developed by said driving means with each cam in like position relative to its associated cam follower, and to positions for
(2) selectively releasing said stop structures at differing times for resumption of rotation by said cams with said cams in predetermined angular positions relative to each other to establish by said cam followers a program of repetitive control cycles.

10. The programming system of claim 9 in which
each of said stop structures carried by said cams extends therefrom parallel to its axis of rotation and in positions displaced from said axis and in which each of said arresting members includes a pawl having a forward flat face adapted to engage its associated stop structure, and
means for biasing said pawl into the path of movement of its associated stop structure upon operation of its associated arresting member to its stop-engaging position.

11. The programming system of claim 9 in which there is provided detent means for each of said arresting members to bias said member in each of its two operating positions.

12. A programmer comprising
a plurality of control devices for producing a repetitive selected control cycle, each said device including a control element and a rotatable driven element,
means for rotatably mounting said driven elements for rotation relative to their associated control elements,
means for producing control actions by said control elements after rotation of said driven elements from corresponding set positions through predetermined fractions of a revolution of said driven elements,
frictional driving means for each of said driven elements, and
set means for each of said driven elements selectively operable independently of said driving means for arresting rotation of said driven elements and for releasing said elements for rotation by said driving means,
said set means having structure for arresting rotation of said driven elements as said driven elements respectively arrive in positions of like displacement from their associated control elements,
said frictional driving means upon said selective operation of said set means for releasing said driven elements establishing selected predetermined angular positions between said driven elements and their associated control elements whereby there may be established said repetitive selected control cycle.

13. A programmer comprising
a plurality of control devices each including a cam follower and a cam, each said cam including stop structure rotatable therewith,
means for rotatably mounting said cams for rotation relative to their associated followers,
frictional driving means for each of said cams, and
set means for each of said cams selectively operable independently of said driving means into and out of the path of movement of said stop structure, said set means when in the paths of movements of all of said cams bringing said cams to standstill in set positions having like displacements from their associated followers,
said frictional driving means upon selective operation of said set means for selected control devices out of the path of the stop structures of said selected devices driving the cams of said selected devices to establish predetermined angular positions between said cams and their associated followers for establishing a desired repetitive control cycle.

14. The programmer of claim 13 in which said set means includes solenoids one for moving said set means into the path of rotary movement of said stop structure and the other for moving said set means out of the path of movement of said stop structure.

(References on following page)

References Cited by the Examiner

UNITED STATES PATENTS

| | | | |
|---|---|---|---|
| 887,835 | 5/08 | Neurether | 74—84 |
| 2,209,858 | 7/40 | Steiert | 74—112 |
| 2,755,008 | 7/56 | Beltz | 74—1.5 X |
| 2,776,009 | 1/57 | Tamburr | 200—153 X |
| 2,851,546 | 9/58 | Phelon et al. | 200—30 |
| 2,963,628 | 12/60 | Ostland | 200—153 |

FOREIGN PATENTS

| | | |
|---|---|---|
| 716,582 | 1/42 | Germany. |
| 164,380 | 12/33 | Switzerland. |

BERNARD A. GILHEANY, *Primary Examiner*.

ROBERT K. SCHAEFER, *Examiner*.